United States Patent [19]

Tokuda

[11] 4,420,531
[45] Dec. 13, 1983

[54] MAGNETIC RECORDING MEDIUM

[75] Inventor: Fuminori Tokuda, Saku, Japan

[73] Assignee: TDK Electronics Co., Ltd., Tokyo, Japan

[21] Appl. No.: 303,288

[22] Filed: Sep. 17, 1981

[30] Foreign Application Priority Data

Sep. 25, 1980 [JP] Japan ................... 55-132343

[51] Int. Cl.³ .............................. G11B 5/70
[52] U.S. Cl. ................... 428/329; 252/62.54; 360/134; 360/135; 360/136; 427/128; 428/323; 428/328; 428/694; 428/900; 428/480
[58] Field of Search ............... 428/694, 695, 900, 328, 428/329, 323, 480; 427/128; 252/62.54; 360/134–136

[56] References Cited

U.S. PATENT DOCUMENTS 4,238,341 12/1980 Kato ................................. 428/900
4,285,825 8/1981 Isobe et al. .......................... 428/900

FOREIGN PATENT DOCUMENTS 54-147811 11/1979 Japan ................................. 428/694
2054622A 2/1981 United Kingdom ................ 428/900

Primary Examiner—Ellis P. Robinson
Attorney, Agent, or Firm—Seidel, Gonda & Goldhammer

[57] ABSTRACT

A magnetic recording medium is composed of a base and a magnetic coating which comprises a binder and a magnetic powder dispersed therein. The magnetic powder, in turn, contains a nonmagnetic powder having an average particle size of not more than 2 μm and a hardness of at least 6 on Mohs scale, in an amount of 1–20% on the basis of the weight of the magnetic powder, and the binder contains a resin such as polyester resin having a group expressed by the formula —SO$_3$M where M is monovalent metal such as Na.

5 Claims, 2 Drawing Figures

F I G. 1
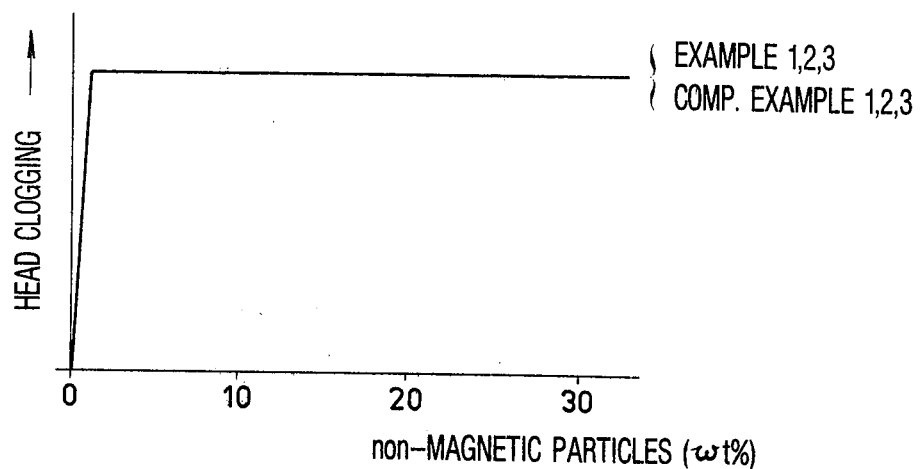
F I G. 2
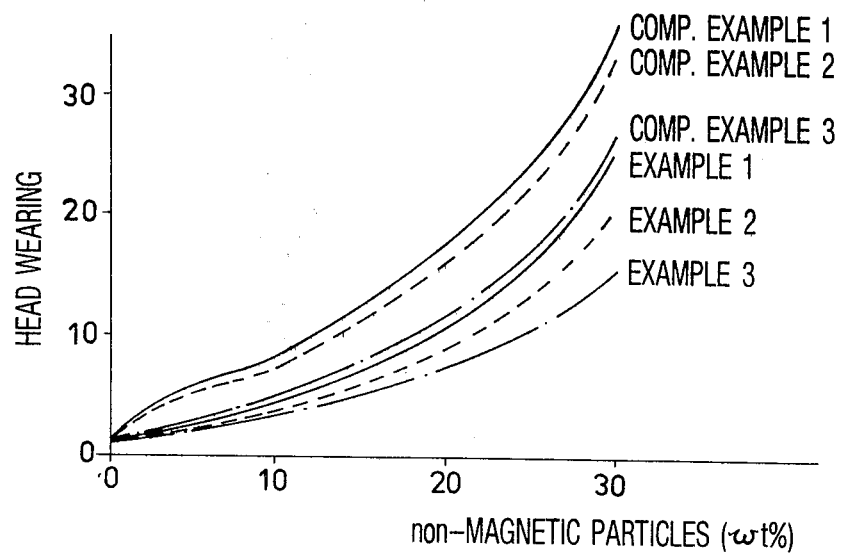

MAGNETIC RECORDING MEDIUM

BACKGROUND OF THE INVENTION

This invention relates to a magnetic recording medium, and more specifically to a magnetic recording tape, such as video tape.

Generally, magnetic recording systems, which depend on the sliding contact of a magnetic medium with a magnetic head or heads for recording or playback, can have various troubles along the contact surfaces. Especially with the systems, such as video recorders, wherein very small magnetic heads scan the moving tape faces at high speeds, there is a danger of the magnetic heads seriously damaging the tapes.

For example, tape surfaces which do not have adequate strength tend to be scraped as they run past the heads. When this happens, the resulting dust of coating will deposit in head gaps, eventually making the recording and playback impossible (due to head clogging). Other possible phenomena include deterioration of the still picture quality (i.e., shortened still time) and a decrease in the signal output with repeated usage.

Many different methods have been proposed to settle the foregoing problems. Of those, reinforcement of the magnetic coating film by the addition of a nonmagnetic powder having a Mohs hardness of over 6 has proved relatively effective. On the other hand, the film reinforced with such a hard substance affects the magnetic heads seriously, with accelerated head abrasion.

BRIEF SUMMARY OF THE INVENTION

This invention, therefore, has for its object to provide a magnetic recording medium having a sufficient magnetic-coating-reinforcing effect and capable of reducing the wear of the magnetic heads of recorders.

After extensive investigations about the wear of magnetic heads, the present inventor has now found that the rate of wear can be greatly reduced by improving the surface smoothness of the magnetic tape and the dispersibility of various substances in the magnetic coating film. In order to achieve a sufficient effect of wear reduction, it is important to improve the dispersibility and surface smoothness in a striking manner. To this end, the use of a resin binder as usual is unsatisfactory and the assistance of a surface active agent or the like is imperative. However, the addition of such a low-molecular-weight substance as a surface active agent will result in troubles including deterioration or changes with time of the physical properties of the product. The present inventor has made improvements also in this respect and has now successfully obtained a very desirable magnetic recording medium composition having the nature of a surface active agent and yet is free from the drawbackings of the agent.

BRIEF DESCRIPTION OF THE DRAWING

FIG. 1 is a graph showing the relation between head clogging and the amount of nonmagnetic powder $Al_2O_3$, $Cr_2O_3$, of $\alpha\text{-}Fe_2O_3$ added; and FIG. 2 is a graph showing the relation between the wear of heads and the amount of nonmagnetic powder $Al_2O_3$, $Cr_2O_3$, or $\alpha\text{-}Fe_2O_3$ added.

DETAILED DESCRIPTION OF THE INVENTION

For the purposes of the invention the expression "a resin having the nature of a surface active agent" is used to mean a resin having a functional group of a very great polarity as its side chain.

Although a polyester resin having a $-SO_3Na$ group is used in Examples of the invention to be given later, the functional group is not limited to the $-SO_3Na$ group, from the viewpoint of imparting the nature of a surface active agent to the magnetic coating composition. Also, the useful resin is not limited to polyester resin. More commonly, it may be a resin having a group expressed by general formula $-SO_3M$ where M is monovalent metal.

It is not essential that all of the resins from which the binder is to be chosen have such a polar group introduced therein, and, where necessary, the resin may be used with a resin ordinarily employed as a binder for magnetic tape, such as a polyurethane resin, polyester resin, vinyl resin (vinyl chloride, vinyl acetate, vinyl alcohol copolymer), epoxy resin, cellulose resin, melamine resin, phenol resin, polyamide resin, acrylic resin, polyvinyl butyral, styrene-butadiene copolymer butadiene-acrylonitrile copolymer, styrene-acrylonitrile-butadiene copolymer, or polyvinylidene chloride, thus forming a binary or multicomponent composition. The polar group-incorporating resin is not necessarily used alone, but several different resins of the kind may be combinedly used, if necessary. Further, an isocyanate compound may be added as a crosslinking agent to improve the frictional properties and durability so that a more excellent magnetic recording medium can be obtained. The term "isocyanate compound" as used herein denotes one of the isocyanates having two or more isocyanate groups and their adducts (e.g., adducts of dimers and trimers and adducts with di- or trihydric polyalcohols).

The polyester resin used in Examples of the invention was one obtained by polycondensation of a composition mainly composed of dicarboxylic acid component (for example, terephthalic acid, sebacic acid), polyhydric alcohol components (for example, ethylene glycol, neopentyl glycol), and $-SO_3Na$-containing dicarboxylic acid component (for example, 5-sodium sulfoisophthalic acid). To meet certain physical property requirements varied carboxylic acids and alcohols may be combinedly used, too. Such a resin may also contain an acid radical, hydroxyl or other groups reactive with polyisocyanate, in which case its prior crosslinking with the polyisocyanate will give good result.

The nonmagnetic powder which may be employed for the present invention is one having a Mohs hardness of not less than 5, preferably not less than 6. It is 2 $\mu$m or less in particle size to ensure surface smoothness of the resulting tape and to eliminate the possibility of dropouts. Desirably, it is added in an amount from 1 to 20 wt. % on the basis of the magnetic powder weight, because if the amount exceeds 20% the residual magnetic flux density and other magnetic characteristics of the product will deteriorate. The above range is essential also for minimizing the wear of heads as will be explained in Examples later. Two or more different nonmagnetic powders may be suitably mixed to achieve a similar advantageous effect. Typical nonmagnetic powders useful for the invention are as follows:

| Chemical formula | Hardness, Mohs |
|---|---|
| $Al_2O_3$ | 9 |
| $Cr_2O_3$ | 8 |
| $\alpha\text{-}Fe_2O_3$ | 6 |

-continued

| Chemical formula | Hardness, Mohs |
|---|---|
| SiC | 9.5 |
| $SiO_2$ | 7 |
| $TiO_2$ | 6.5–7 |
| $ZrO_2$ | 7 |
| $CeO_2$ | 7 |
| Ceramic powder | 5–8 |
| Ferrite powder | 5–8 |

The magnetic powder to be used in the invention is that of γ-iron oxide, cobalt-adsorbed γ-iron oxide, Co-doped γ-iron oxide, $CrO_2$, or magnetic alloy or metal powder.

Where necessary, an antistatic agent, carbon black, lubricant, and/or other additives may be added to the powder.

The invention is illustrated by the following examples.

The polyester resin in the examples was produced by polymerizing the formulation: 15 mol % of terephthalic acid, 30 mol % of sebacic acid, 5 mol % of 5-sodium sulfoisophthalic acid, 20 mol % of ethyleneglycol and 30 mol % of neopentylglycol. The molecular weight was about 20,000. The polyester resin in the comparative examples was produced by polymerizing a formulation similar to the above formulation except that 5-sodium sulfoisophthalic acid was replaced with 5 mol % of isophthalic acid. The molecular weight was about 20,000.

EXAMPLES 1, 2, and 3

Powdered $Al_2O_3$ having an average particle size of 0.5μ was added in varied proportions, from 0 to 120 parts by weight, to a mixture consisting of

| | |
|---|---|
| Co—adsorbed γ-$Fe_2O_3$ | 400 parts by weight |
| Vinyl chloride-vinyl acetate copolymer (marketed by UCC of the U.S. under the trade name "VAGH") | 50 parts by weight |
| —$SO_3Na$—containing polyester resin | 50 parts by weight |
| Lubricant | 10 parts by weight |
| Methyl ethyl ketone | 400 parts by weight |
| Toluene | 400 parts by weight | and the whole mixture was used as the starting composition for Example 1. Similarly, $Cr_2O_3$ powder having an average particle size of 0.3μ instead was added to the mixture of the components listed above and the whole mixture was used as the starting composition for Example 2. As a further alternative, α-$Fe_2O_3$ powder having an average particle size of 0.5μ was used to prepare the starting composition for Example 3. Each composition was thoroughly dispersed in the usual manner and was applied to a polyethylene terephthalate film to form a coating layer 5 μm thick when dry, and then the coat was dried. The coated film was mirror finished by calender rolls heated at 70° C., and was slitted into magnetic recording tapes of a suitable width.

The degrees of light reflection from the surfaces of the magnetic tapes thus obtained were determined. The results were as tabulated below. These tapes were also tested for head clogging and head wear. The data are plotted, respectively, in FIGS. 1 and 2.

COMPARATIVE EXAMPLES 1, 2, and 3

In the starting compositions of Examples 1, 2, and 3, the —$SO_3Na$-containing polyester resin was replaced by the —$SO_3Na$-free polyester resin as referred to above, and for the rest the same components were used in the same proportions to prepare starting compositions for Comparative Examples 1, 2, and 3. Using the same procedure and the same conditions as in Examples, magnetic recording tapes were made from those compositions. The surface properties (degrees of light reflection) of the tapes so obtained were as tabulated below. The results of head clogging and wear tests are graphically represented in FIGS. 1 and 2.

| | Example | | | Comparative Example | | |
|---|---|---|---|---|---|---|
| | 1 | 2 | 3 | 1 | 2 | 3 |
| Before mirror finishing | 110–115% | 110–115% | 110–115% | 75–80% | 75–80% | 75–80% |
| After mirror finishing | 140–145% | 140–145% | 140–145% | 115–120% | 115–120% | 115–120% |

(on the basis of the degree of light reflection of the standard plate which was fixed to be 90% in conformity with the Japanese Industrial Standards).

Comparisons between the test results of Examples 1 to 3 and those of Comparative Examples 1 to 3 make it clear that the magnetic tapes according to the present invention are much superior in surface quality, both before and after the mirror finishing. This superiority is presumably ascribable to the fact that the —$SO_3Na$-containing polyester resin has strikingly improved the dispersibility of the contents in the coating composition.

As will be appreciated from FIG. 1, the beneficial effect of the nonmagnetic powder content upon head clogging is substantially the same in all examples, improving the resistance to head clogging, provided that the content is not less than one percent on the basis of the weight of the magnetic powder.

FIG. 2 indicates that, throughout the examples, the more the tape contains the nonmagnetic powder, the faster the head will wear down. The wear will be permissibly reduced if the content is limited to 20% or less. Also, comparing the results of Examples 1 to 3 with those of Comparative Examples 1 to 3, it will be seen that the head wear is far less with the tapes of the invention than with the reference ones. Presumably this is also attributed to the distinct improvement in the surface quality as well as in the dispersibility of the contents in the magnetic coating film due to the employment of the —$SO_3Na$-containing resin.

From the results thus far explained, it should be clear that the tapes obtained in Examples of the invention are excellent, with the coating-film-reinforcing effects as good as those of the tapes of Comparative Examples but with far less head-wearing effects.

Similar advantageous effects will be achieved with the compositions according to the invention combined with other nonmagnetic powder and other resin than those mentioned in the foregoing description.

It will be obvious for those skilled in the art that the present invention can be modified in various other ways within the spirit of this invention.

What is claimed is:

1. A magnetic recording medium composed of a base and a magnetic coating formed thereon and comprising a binder and a magnetic powder dispersed in the binder, characterized in that said magnetic powder contains a nonmagnetic powder having an average particle size of not more than 2 μm and a Mohs hardness of at least 6, in an amount of 1 to 20% on the basis of the weight of the magnetic powder, and said binder contains a dispersant resin having a functional group attached thereto expressed by the formula —$SO_3M$ where M is a monovalent metal.

2. A magnetic recording medium according to claim 1, wherein said group is —$SO_3Na$.

3. A magnetic recording medium according to claim 1 or 2, wherein said dispersant resin is polyester resin.

4. A magnetic recording medium according to claim 1, wherein said dispersant resin is a polyester resin having a molecular weight of about 20,000.

5. A magnetic recording medium composed of a base and a magnetic coating formed thereon and comprising a binder and a magnetic powder dispersed in the binder, characterized in that said magnetic powder contains a nonmagnetic powder having an average particle size of not more than 2 μm and a Mohs hardness of at least 6, in an amount of 1 to 20% on the basis of the weight of the magnetic powder, and said binder contains a dispersant polyester resin having a molecular weight of about 20,000 and a functional group attached thereto expressed by the formula —$SO_3Na$.

* * * * *